Patented May 9, 1933

1,908,093

UNITED STATES PATENT OFFICE

IRA WILLIAMS, OF LAKEWOOD, OHIO, ASSIGNOR, BY MESNE ASSIGNMENTS, TO E. I. DU PONT DE NEMOURS & COMPANY, OF WILMINGTON, DELAWARE, A CORPORATION OF DELAWARE

PROCESS OF PRODUCING AGE-RESISTING RUBBER COMPOSITIONS AND PRODUCT OBTAINED THEREBY

No Drawing. Application filed May 22, 1928. Serial No. 279,350.

My co-pending application, Serial #279,851, filed on even date herewith, discloses that n-butyraldehyde can be caused to react with aromatic amines in various ways, and that the reaction products obtained from equivalent amounts of the aldehyde and the amine in the presence of certain amounts of weak organic acid, are particularly valuable.

When neutral n-butyraldehyde is allowed to react in equi-molecular proportions with aniline under exclusion of acid, a crystalline, probably di-molecular simple condensation product is obtained, which, when recrystalized from alcohol, melts at 92° C.; this product has practically no beneficial influence upon the vulcanization of rubber.

The reaction between equivalent amounts of n-butyraldehyde and a primary aromatic amine, when effected in the presence of a concentrated acid, produces, however, a different type of compound. With strong acids, oily, noncrystallizable condensates are obtained which hardly affect the vulcanization of rubber.

When using certain weak organic acids, another type of oily condensate is obtained, and the products of this type have a very beneficial effect on the vulcanization. The weak organic acids which produce this novel result are those which have a dissociation constant $k$ measured at ordinary temperature and in water solution less than about $2 \times 10^{-5}$, such as, for instance, the volatile aliphatic acids, acetic, propionic, butyric acids, etc.

The amount of acid used in the condensation is of great importance in determining the properties of the condensates. Below 1/50 molecular amount the influence of the acid on the vulcanization properties is rather limited, and I do not consider the use of products made in the presence of such small amounts of acids as coming within the scope of my invention.

With increasing amounts of the weak acid present in the condensation reaction mixture, the products evidence increasing accelerating properties and show also the valuable property of retarding the deterioration of vulcanized rubber. Both the accelerating and anti-ageing properties reach their maximum when about 1/30 mol. of the weak acid is used. With further increase of the amount of acid there is a rapid decrease of the accelerating properties, whereas the anti-ageing properties remain at about the same strength.

The primary aromatic amines useful for the production of my novel anti-ageing compounds can be exemplified by aniline, the toluidines, xylidenes, naphthylamines. Diamines, such as phenylene, toluylene, naphthylenediamines, benzidine, etc., will condense in a similar manner with n-butyraldehyde and these condensates are also useful in the production of vulcanized rubber of improved ageing properties.

The process of making these novel condensates comprises adding butyraldehyde slowly to the amine containing the specified amount of the weak organic acid; the reaction between the aldehyde and the amine is practically instantaneous, and strongly exothermic. The rate of addition of the aldehyde is best so regulated as to maintain a condition whereby the water formed in the condensation distills. The water formed and the acid are then eliminated by any convenient method, as, for instance, distillation under reduced pressure. The resulting condensates are oily, yellowish to brownish, liquids. They usually contain traces of the acid used as the condensing agent, which, however, does not seem to affect the properties of the products. No chemical formula for the condensation reaction or the chemical structure and composition of the condensates can be given which will account for the difference in the properties of the products obtained with different kinds and proportions of acids. For all practical purposes these differences show up only when the products are used in the vulcanization of rubber. The terms "condensing", "condensation reactions", "condensates", etc., as used herein, do not imply any particular chemical reaction or composition of the products but indicate merely that a reaction occurs which involves the separation of water.

The present invention comprises the use of these products in the vulcanization of rubber and the new age-resisting vulcanized rubber products obtained when curing rubber mixes containing my novel n-butyraldehyde-amine condensates.

A small amount of these condensates is milled into the rubber, together with the usual vulcanization ingredients, such as sulfur, zinc oxide, and eventually an accelerator, etc., and the rubber compound heated to vulcanization temperatures. The condensates made in the presence of from about 1/50 to about 1/3 mol. of the acid are in themselves accelerators.

A butyraldehyde-aniline condensate made in the presence of about 1/30 molecular proportion of acetic acid was used as the accelerator in the following composition: Rubber 100, sulfur 3, zinc oxide 5, accelerator 1 part. The physical properties of the vulcanizates were as follows:

| Min. cure at 140° C. | Tensile at 600% elongation | Tensile at break |
| --- | --- | --- |
| 30 | 485 | 2320 |
| 45 | 580 | 2500 |
| 60 | 553 | 2670 |

The vulcanizates show up exceedingly well under the Geer ageing test.

Condensates obtained from equivalent amounts of n-butyraldehyde and an aromatic amine in the presence of more than about 1/3 mol. of acid show hardly any accelerating properties. They impart, however, to the vulcanizates improved ageing qualities. Compounds of this type are usually referred to as antioxidants or anti-ageing compounds. The most common laboratory test for such compounds is to submit samples of the cured rubber to the so-called Geer test, which comprises heating said samples to 70° C. and measuring the physical properties after certain periods of time.

I preferably use my novel high acid condensates in rubber mixes containing another accelerator which may be one of my low acid condensates or any of the usual accelerators or any mixture of same. The results as to anti-ageing properties will be entirely comparable. I am, in this manner, enabled to produce various kinds of vulcanization results without impairing the ageing properties.

For comparison purposes, I am giving below in table form the results of Geer tests on a standard rubber mix containing different of my novel antioxidant condensates. The mix consisted of 100 rubber, 6 sulfur, 5 zinc oxide, 1 diphenylguanidine. One part of the antioxidant was milled into the rubber with the other ingredients. The test pieces used in the Geer test were all cured to about the same optimum rate of cure, around 4,000# tensile at break.

"A" was a n-butyraldehyde-aniline condensate made in the presence of about 1/30 mol. acetic acid. The product is a light amber colored, slightly viscous, liquid.

"B" was a n-butyraldehyde-aniline condensate made in the presence of 2 mols. of acetic acid. The product is a light yellow, slightly viscous, liquid.

"C" was a n-butyraldehyde-aniline condensate made in the presence of ½ mol. acetic acid. It resembles in physical appearance, the product "B".

"D" was a n-butyraldehyde-alpha-naphthylamine condensate made in the presence of 1 mol. acetic acid; it is a brownish, slightly viscous, liquid.

"E" was a n-butyraldehyde-o-toluidine condensate made in the presence of 2 mols. of acetic acid. It is a brownish-yellow, slightly viscous, liquid.

"F" is added for comparing the above with a butyraldehyde-aniline condensate outside of the scope of my invention; it was made by condensing equi-molecular amounts of n-butyraldehyde and aniline in the absence of acid. It is a crystalline compound melting at about 92° C.

| Antioxidant used | Initial tensile at break | Tensile at break after days ageing | | | | |
| --- | --- | --- | --- | --- | --- | --- |
| | | 3 | 6 | 8 | 12 | 15 |
| A | 4615 | | 4650 | 3790 | 3120 | 2870 |
| B | 4090 | 3675 | 3700 | 3430 | 2915 | 2820 |
| C | 4180 | 3700 | 3115 | 3350 | 2580 | 2690 |
| D | 4140 | | 3730 | 3070 | 2560 | 2290 |
| E | 3960 | | 3800 | 2670 | 2415 | 1125 |
| F | 4380 | 276 | | | | |
| None | 4100 | 3935 | | 1320 | 336 | |

This table shows clearly the difference in action of the acid free condensates and those made with various proportions of a weak organic acid. The acid free condensate speeds up the deterioration as, after 3 days ageing, the vulcanizate is, for all practical purposes, dead. It also shows the great improvement in ageing obtained with the acid condensates. In each instance such vulcanizates show, after 12 days, when the blank is completely deteriorated, still considerably more than half the original tensile at break. The slope of the deterioration curve of the vulcanizate "A" indicates a life of at least three times that of the blank.

An equi-molecular condensation product of n-butyraldehyde and aniline has been suggested previously for use in the vulcanization of rubber, but, so far as I am aware, has never been of any practical application. My discovery of the action of substantial amounts of weak organic acids upon the properties of condensation products of n-butyraldehyde and aromatic primary amines accounts for this failure. Commercial n-butyraldehyde contains often traces of butyric acid; such amounts do not exceed on the average about ½ of 1%, and, as a matter of fact, I have never found among the numerous samples of technical or commercial butyraldehyde tested by me, any one which contained more than about 1% of acid expressed as butyric acid; this corresponds to less than 1/100 molecular proportion. Condensates made in the presence of such low acid concentrations have no particular accelerating or antioxidant properties; it is only when the acid concentration reaches a much higher figure, around 1/50 mol., that the antioxidant properties become so marked as to be of any value.

I claim:

1. The process of producing a vulcanized rubber of improved age-resisting properties, which comprises vulcanizing a rubber mix in the presence of a product obtainable by condensing n-butyraldehyde with an equi-molecular amount of an aromatic primary amine prepared in the presence of at least 1/30 mol. of a weak organic acid for each molecular amount of aldehyde.

2. The process of producing a vulcanized rubber of improved age-resisting properties, which comprises mixing rubber with vulcanizing ingredients and a small amount of a product obtainable by condensing equimolecular proportions of n-butyraldehyde and an aromatic primary amine in the presence of at least 1/30 molecular amount of an organic acid for each molecular amount of aldehyde, said acid having a dissociation constant $k$ measured at ordinary temperature and in aqueous solution less than about $2 \times 10^{-5}$, and heating the resulting mix to vulcanization temperature.

3. The process of producing a vulcanized rubber of improved age-resisting properties, which comprises mixing rubber with vulcanizing ingredients and a small amount of a product obtainable by condensing equimolecular properties of n-butyraldehyde and aniline in the presence of from about 1/30 to about 2 mol. proportion of acetic acid for each molecular amount of aldehyde and heating the resulting mix to vulcanization temperature.

4. The process of producing a vulcanized rubber of improved age-resisting properties, which comprises mixing rubber with sulfur, other vulcanizing ingredients, an organic accelerator, and a liquid antioxidant which is obtainable by reacting equi-molecular amounts of n-butyraldehyde and an aromatic primary amine in the presence of at least 1/3 mol. of a weak organic acid for each molecular amount of aldehyde and eliminating the excess acid and the water formed, and heating the mix to vulcanization temperature.

5. A vulcanized rubber product of improved age-resisting properties having incorporated therein a liquid antioxidant obtainable by condensing equi-molecular amounts of n-butyraldehyde and an aromatic primary amine in the presence of at least 1/3 molecular equivalent of a weak organic acid for each molecular amount of aldehyde.

6. A vulcanized rubber product of improved age-resisting properties having incorporated therein a liquid antioxidant obtainable by condensing equi-molecular amounts of n-butyraldehyde and aniline in the presence of from about 1/3 to about 2 molecular amounts of acetic acid for each molecular amount of aldehyde and eliminating the excess acid and water formed.

7. The process of producing a vulcanized rubber of improved age-resisting properties, which comprises vulcanizing a rubber mix in the presence of a product obtainable by condensing n-butyraldehyde with an equi-molecular amount of aniline prepared in the presence of at least 1/30 mol. of a weak organic acid for each molecular amount of aldehyde.

8. The process of producing a vulcanized rubber of improved age-resisting properties, which comprises vulcanizing a rubber mix in the presence of a product obtainable by condensing n-butyraldehyde with an equimolecular amount of ortho-toluidine prepared in the presence of at least 1/30 mol. of a weak organic acid for each molecular amount of aldehyde.

9. The process of producing a vulcanized rubber of improved age-resisting properties, which comprises vulcanizing a rubber mix in the presence of a product obtainable by condensing n-butyraldehyde with an equimolecular amount of a naphthylamine prepared in the presence of at least 1/30 mol. of a weak organic acid for each molecular amount of aldehyde.

10. The process of producing a vulcanized rubber of improved age-resisting properties, which comprises vulcanizing a rubber mix in the presence of a product obtainable by condensing n-butyraldehyde with an equimolecular amount of alpha-naphthylamine prepared in the presence of at least 1/30 mol. of a weak organic acid for each molecular amount of aldehyde.

11. The process of producing a vulcanized rubber of improved age-resisting properties, which comprises mixing rubber with vulcanizing ingredients and a small amount of a product obtainable by condensing equimolecular proportions of n-butyraldehyde and ortho-toluidine in the presence of from about 1/30 to about 2 mol. proportions of acetic acid for each molecular amount of aldehyde and heating the resulting mix to vulcanization temperature.

12. The process of producing a vulcanized rubber of improved age-resisting properties, which comprises mixing rubber with vulcanizing ingredients and a small amount of a product obtaintable by condensing equimolecular proportions of n-butyraldehyde and a naphthylamine in the presence of from about 1/30 to about 2 mol. proportions of acetic acid for each molecular amount of aldehyde and heating the resulting mix to vulcanization temperature.

13. The process of producing a vulcanized rubber of improved age-resisting properties, which comprises mixing rubber with vulcanizing ingredients and a small amount of a product obtainable by condensing equi-molecular proportions of n-butyraldehyde and alpha-naphthylamine in the presence of from about 1/30 to about 2 mol. proportions of acetic acid for each molecular amount of aldehyde and heating the resulting mix to vulcanization temperature.

14. The process of producing a vulcanized rubber of improved age-resisting properties, which comprises mixing rubber with sulfur, other vulcanizing ingredients, an organic accelerator, and a liquid antioxidant which is obtainable by reacting equi-molecular amounts of n-butyraldehyde and aniline in the presence of at least 1/3 mol. of a weak organic acid for each molecular amount of aldehyde and eliminating the excess acid and the water formed, and heating the mix to vulcanization temperature.

15. The process of producing a vulcanized rubber of improved age-resisting properties, which comprises mixing rubber with sulfur, other vulcanizing ingredients, an organic accelerator, and a liquid antioxidant which is obtainable by reacting equi-molecular amounts of n-butyraldehyde and ortho-toluidine in the presence of at least 1/3 mol. of a weak organic acid for each molecular amount of aldehyde and eliminating the excess acid and water formed, and heating the mix to vulcanization temperature.

16. The process of producing a vulcanized rubber of improved age-resisting properties, which comprises mixing rubber with sulfur, other vulcanizing ingredients, an organic accelerator, and a liquid antioxidant which is obtainable by reacting equi-molecular amounts of n-butyraldehyde and a naphthylamine in the presence of at least 1/3 mol. of a weak organic acid for each molecular amount of aldehyde and eliminating the excess acid and the water formed, and heating the mix to vulcanization temperature.

17. The process of producing a vulcanized rubber of improved age-resisting properties, which comprises mixing rubber with sulfur, other vulcanizing ingredients, an organic accelerator, and a liquid antioxidant which is obtainable by reacting equi-molecular amounts of n-butyraldehyde and alpha-naphthylamine in the presence of at least 1/3 mol. of a weak organic acid for each molecular amount of aldehyde and eliminating the excess acid and the water formed, and heating the mix to vulcanization temperature.

18. Rubber having incorporated therein a product obtainable by condensing n-butyraldehyde with an equi-molecular amount of an aromatic primary amine prepared in the presence of at least 1/30 mol. of a weak organic acid for each molecular amount of aldehyde.

19. Rubber having incorporated therein a product obtainable by condensing n-butyraldehyde with an equi-molecular amount of aniline prepared in the presence of at least 1/30 mol. of a weak organic acid for each molecular amount of aldehyde.

20. Rubber having incorporated therein a product obtainable by condensing n-butyraldehyde with an equi-molecular amount of ortho-toluidine prepared in the presence of at least 1/30 mol. of a weak organic acid for each molecular amount of aldehyde.

21. Rubber having incorporated therein a product obtainable by condensing n-butyraldehyde with an equi-molecular amount of a naphthylamine prepared in the presence of at least 1/30 mol. of a weak organic acid for each molecular amount of aldehyde.

22. Rubber having incorporated therein a product obtainable by condensing n-butyraldehyde with an equi-molecular amount of alpha-naphthylamine prepared in the presence of at least 1/30 mol. of a weak organic acid for each molecular amount of aldehyde.

23. Rubber having incorporated therein a product obtainable by condensing equi-molecular amounts of n-butyraldehyde and an aromatic primary amine in the presence of from about 1/3 to about 2 molecular amounts of a weak organic acid for each molecular amount of aldehyde.

24. Rubber having incorporated therein a product obtainable by condensing equi-molecular amounts of n-butyraldehyde and ortho-toluidine in the presence of from about 1/3 to about 2 molecular amounts of a weak organic acid for each molecular amount of aldehyde.

25. Rubber having incorporated therein a product obtainable by condensing equi-molecular amounts of n-butyraldehyde and a naphthylamine in the presence of from about 1/3 to about 2 molecular amounts of a weak organic acid for each molecular amount of aldehyde.

26. Rubber having incorporated therein a product obtainable by condensing equi-molecular amounts of n-butyraldehyde and alpha-naphthylamine in the presence of from about 1/3 to about 2 molecular amounts of a weak organic acid for each molecular amount of aldehyde.

In testimony whereof, I affix my signature.

IRA WILLIAMS.